United States Patent
Werner et al.

(10) Patent No.: US 12,420,738 B2
(45) Date of Patent: Sep. 23, 2025

(54) BELT STRAP AND METHOD FOR PRODUCING A BELT STRAP

(71) Applicants: ZF AUTOMOTIVE GERMANY GMBH, Alfdorf (DE); ZF FRIEDRICHSHAFEN AG, Friedrichshafen (DE)

(72) Inventors: Christian Werner, Volkach (DE); Victor Gonzalez Mora, Dittelbrunn (DE); Viktorija Mecnika, Schwabisch Gmünd (DE)

(73) Assignees: ZF AUTOMOTIVE GERMANY GMBH, Alfdorf (DE); ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/833,068

(22) PCT Filed: Jan. 26, 2023

(86) PCT No.: PCT/EP2023/051866
§ 371 (c)(1),
(2) Date: Jul. 25, 2024

(87) PCT Pub. No.: WO2023/144241
PCT Pub. Date: Aug. 3, 2023

(65) Prior Publication Data
US 2025/0108775 A1      Apr. 3, 2025

(30) Foreign Application Priority Data
Jan. 26, 2022   (DE) .................... 10 2022 101 784.2

(51) Int. Cl.
*B60R 22/12*          (2006.01)

(52) U.S. Cl.
CPC .................................... *B60R 22/12* (2013.01)

(58) Field of Classification Search
CPC . B60R 2022/4808; B60R 22/48; B60R 22/12; B60R 22/00
(Continued)

(56) References Cited

U.S. PATENT DOCUMENTS 10,328,893 B2 *   6/2019   Shimazaki ............. B60R 22/34
11,535,189 B2 *  12/2022   Wang ....................... B60R 22/12
(Continued)

FOREIGN PATENT DOCUMENTS

| CN | 211918608 U | 11/2020 |
| DE | 112015001252 B4 | 10/2021 |
| JP | 2019001249 A | 1/2019 |

OTHER PUBLICATIONS

English Translation of Hiroki JP 2019001249 (Year: 2019).*
(Continued)

*Primary Examiner* — James A Shriver, II
*Assistant Examiner* — Caitlin Anne Miller
(74) *Attorney, Agent, or Firm* — Tarolli, Sundheim, Covell &Tummino LLP

(57) ABSTRACT

The invention relates to webbing (10) for a seatbelt system of an automotive vehicle, comprising a webbing body (12), at least one electrical conductor (14), and comprising a flexible printed circuit (16) arranged on the webbing body (12), wherein the at least one electrical conductor (14) is arranged and electrically contacted on the flexible printed circuit (16) using at least one electrically conductive adhesive (30). Further, a method of manufacturing a webbing (10) is described.

14 Claims, 3 Drawing Sheets

(58) Field of Classification Search
USPC .................................................. 280/801.1
See application file for complete search history.

(56) References Cited

U.S. PATENT DOCUMENTS

| | | | | |
|---|---|---|---|---|
| 2004/0259391 | A1* | 12/2004 | Jung | D03D 15/258 |
| | | | | 439/37 |
| 2007/0210074 | A1* | 9/2007 | Maurer | H05B 3/56 |
| | | | | 219/549 |
| 2012/0192988 | A1* | 8/2012 | Welz | D03D 1/0005 |
| | | | | 139/383 R |
| 2017/0088096 | A1* | 3/2017 | Luebbers | B60R 22/12 |
| 2024/0200238 | A1* | 6/2024 | Mecnika | D03D 1/0088 |

OTHER PUBLICATIONS

International Search Report for corresponding International application No. PCT/EP2023/051866, with a date of mailing Apr. 21, 2023, 4 pages.

* cited by examiner

BELT STRAP AND METHOD FOR PRODUCING A BELT STRAP

RELATED APPLICATIONS

This application is a U.S. National Stage Application filed under 35 USC 371, claiming priority to Serial No. PCT/EP2023/051866, filed on 26 Jan. 2023; which claims priority from DE Patent Application 10 2022 101 784.2, filed 26 Jan. 2022, the entireties of which are hereby incorporated herein by reference.

TECHNICAL FIELD

The invention relates to webbing for a seatbelt system of an automotive vehicle as well as to a method of manufacturing a webbing.

BACKGROUND

A seatbelt system serves to restrain a vehicle occupant, when the vehicle is strongly decelerated, so that the occupant him-/herself is decelerated as evenly as possible and is prevented from contacting objects inside the vehicle such as a steering wheel or an instrument panel.

Apart from the safety aspect, the webbing can also fulfil comfort functions such as a heating function. In addition, a sensor function can be integrated in the webbing.

To fulfil said functions, it is necessary to establish an electric contact with the electrical conductors provided in the webbing for this purpose.

Since the webbing is wound and unwound particularly frequently during its service life, electrical contacting is subjected to high loads.

SUMMARY

Therefore, it is an object of the invention to enable the electrical conductors provided in the webbing to be electrically contacted in a particularly reliable manner, which can withstand the loads occurring.

According to the invention, this object is achieved by webbing for a seatbelt system of a vehicle, comprising a webbing body, at least one electrical conductor and a flexible printed circuit arranged on the webbing body, wherein the at least one electrical conductor is arranged on the flexible printed circuit and is electrically contacted by means of at least one electrically conductive adhesive.

The webbing according to the invention offers the advantage that the electrical conductors are not contacted using solder. Thus, soldered points which are relatively brittle and can easily break when subjected to bending stress are avoided. Adhesives, on the other hand, can be manufactured easily with high flexibility, allowing the electrical contacting of the electrical conductors to withstand bending stresses extremely well, as they occur when the webbing is wound onto and unwound from a belt retractor or when it is passed via a deflector. Consequently, the risk that the electrical contacting is damaged or breaks is reduced.

Preferably, the adhesive is elastic to a certain extent, whereby it can withstand bending stresses even better.

The adhesive is an adhesive pad, an adhesive tape (one-sided or two-sided), a liquid adhesive, for example. Each of them can be electrically conductive. The electrically conductive adhesive contains in particular electrically conductive particles. The adhesive pad may include an adhesive layer having electrically conductive particles.

The use of an adhesive pad is preferred over a liquid adhesive, as adhesive pads can be prefabricated and can be applied more easily.

The use of a flexible printed circuit (FPC) offers the advantage that, when the webbing is moving, the printed circuit can deform along with the webbing, for instance when the webbing is wound onto a belt reel.

The electrical conductor is, e.g., a wire, an electrically conductive thread or a strand. Such conductors are suited particularly well for use in a webbing, as they are flexible and therefore the flexibility of the webbing is not restricted by the electrical conductor.

The flexible printed circuit (FPC) includes, for example, a single-layer or multi-layer plastic film and a metal foil arranged on the plastic film, the at least one electrical conductor being interposed between the metal foil and the electrically conductive adhesive. The metal foil and the electrically conductive adhesive serve for electrically contacting the electrical conductor. The plastic film serves as a carrier material for the metal foil.

The use of films and foils helps achieve the advantage that the flexible printed circuit has a minimum construction height.

The metal foil is a copper foil, for example.

The plastic film is a polyimide film, for example. Polyimide is resistant to high temperatures and resistant to fluids, and thus is particularly well suited as a carrier for an electrical conductor, in particular as the electrical conductor can heat in operation. High temperatures can also occur when the electrical conductor is connected to the metal foil.

In an alternative embodiment, the flexible printed circuit includes a plastic film, and the at least one electrical conductor is fastened to and electrically contacted with the printed circuit by means of two adhesives arranged to be overlapping on the plastic film, the electrical conductor being interposed between the two adhesives. Consequently, the metal foil is replaced with a further electrically conductive adhesive. In this way, the flexibility of the webbing is additionally improved in the area of the flexible printed circuit as compared to an embodiment comprising a metal foil, as the electrically conductive adhesive can be manufactured to have a higher flexibility than a metal foil.

According to one aspect, a further plastic film is provided which is arranged on the first plastic film and which has a recess in the area of the at least one adhesive. The additional plastic film can also be made of polyimide.

The additional plastic film has a heat-insulating effect. In combination with a metal foil, the additional plastic film moreover serves for sealing, in particular along the edges of the printed circuit and, resp., the metal foil. This helps avoid corrosion of the metal foil along the edges thereof. Only the exposed surface of the metal foil has to be provided with additional anti-corrosive. This can be done by a thermotransfer strip, for example.

According to an embodiment, at least two electrical conductors are provided, wherein the two electrical conductors are connected to each other in an electrically conducting manner by the flexible printed circuit. In this way, an electric circuit can be closed by the flexible printed circuit.

According to an embodiment, the webbing has a woven webbing body which includes warp threads extending in the longitudinal direction and weft threads extending transversely to the warp threads, wherein the at least one electrical conductor is woven into the webbing body as a warp thread or a weft thread. As a result, the electrical conductor can be integrated particularly easily into the webbing body already during manufacture of the latter.

Alternatively, it is also conceivable that the electrical conductor is sewn onto the webbing body as sewing thread or is adhesively bonded onto the webbing body.

Preferably, the flexible printed circuit is adhesively bonded on the webbing body. Thus, it is particularly easy to fasten the printed circuit to the webbing body. For example, the printed circuit is fastened to the webbing body using a double-sided adhesive tape.

Moreover, a padding can be arranged on the flexible printed circuit. The padding is, e.g., a compressible film, a foamed flat material, a nonwoven or other non-conductive material which is intended to protect the flexible printed circuit against damage.

According to an embodiment, the printed circuit can be covered by a plastic cap. The plastic cap serves to stabilize the webbing body in the area of the printed circuit. In otherwords, the webbing body is stiffened in areas by the plastic cap. Consequently, the webbing body cannot be deformed or can be deformed less strongly in the area of the printed circuit so that also the printed circuit is not or only slightly deformed. The plastic cap thus prevents the flexible printed circuit from being excessively deformed and, in this way, contributes to the longest possible service life of the printed circuit and the electrical contacting.

For example, the plastic cap is melted onto the flexible printed circuit, causing the plastic cap to adapt optimally to the printed circuit and to an electrical conductor connected to the printed circuit.

The plastic cap adheres to the flexible printed circuit already by being melted thereon.

As an alternative or in addition, the plastic cap can be fixed to the webbing body by means of ultrasonic welding. In doing so, it is possible to fix the plastic cap to the webbing so that the edges of the flexible printed circuit are covered. However, it is also possible to fix the plastic cap to the webbing only without the flexible printed circuit being touched by the plastic cap.

As a further alternative or in addition, the plastic cap can be sewn or bonded to the webbing body.

A protective cap can be formed by using a heated and, thus, hardened textile material instead of using a plastic material. For example, the textile material is a felt material, specifically a pre-shaped bi-component felt material.

Alternatively, or additionally, the flexible printed circuit can be covered by a thermoplastic film. The thermoplastic film also serves as a protection for the flexible printed circuit and the electrical conductors in the area of the printed circuit. In particular, the thermoplastic film prevents the electrical conductors from being abraded from the printed circuit or the printed circuit from being abraded from the webbing body.

The thermoplastic film is arranged in particular above the padding, if a padding is provided.

The thermoplastic film is a thermotransfer film, for example, that is, the film is applied to the webbing body by heat, the film bonding with the webbing body. As a result, no seams which would be visible on the back of the webbing body are required.

Instead of a thermotransfer film, also a PET film which is connected to the webbing by ultrasonic welding can be arranged on the flexible printed circuit.

The at least one electrical conductor is a heat conductor or a sensor, for example, or the electrical conductor is electrically connected to a sensor or to an electronic unit. The electronic unit may be a microelectronic unit which is integrated in the electrical conductor.

Thus, different functions can be realized in the webbing.

In a particularly advantageous manner, strain relief of the electrical conductors can be achieved by the electrical conductors extending in an arc or meander shape in the vicinity of the adhesive element.

According to the invention, the object is further achieved by a method of manufacturing webbing, and specifically webbing according to the invention as above-described, comprising the following steps:

a webbing body and at least one electrical conductor are provided, at least two multi-layer adhesive elements are provided each of which is arranged on a carrier film, the layers of a first adhesive element comprising a plastic film and a metal foil or an adhesive, and the layers of a second adhesive element comprising a plastic film and an adhesive, a first and a second adhesive element are bonded together, wherein the at least one electrical conductor is inserted between the adhesive elements and is in contact with the metal foil and, resp., the adhesive, and the adhesive elements are adhesively bonded to the electrical conductor on the webbing body.

On the one hand, the method according to the invention offers the advantage that no soldering is necessary for contacting the electrical conductors, which entails the advantages described already in connection with the webbing.

In addition, bonding is easier than soldering in terms of manufacture, which renders the method according to the invention particularly efficient.

As the required layers of the flexible printed circuit are provided as an adhesive element prefabricated on the carrier film, the electrical contacting of the electrical conductors can be materialized in very few working steps.

BRIEF DESCRIPTION OF THE DRAWINGS

Further advantages and features of the invention will be evident from the following description and from the attached drawings which are referred to, and wherein.

DESCRIPTION

Figure 1:
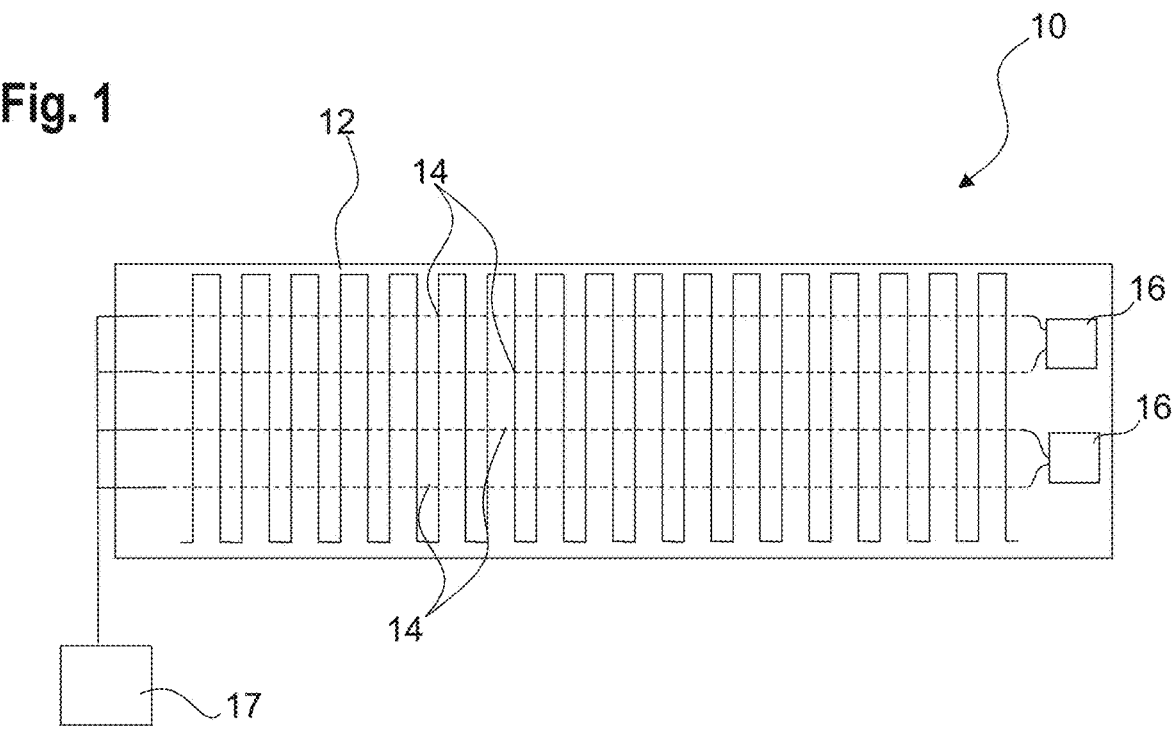
FIG. 1 schematically shows webbing according to the invention in a top view.

FIG. 1 schematically illustrates a webbing 10 for a seatbelt system of an automotive vehicle.

The webbing 10 includes a webbing body 12. The webbing body 12 is usually woven and comprises warp threads extending in the longitudinal direction and weft threads extending transversely to the warp threads. In FIG. 1, only few threads are schematically shown for convenience.

The webbing 10 further comprises plural electrical conductors 14.

The electrical conductors 14 are formed, for example, by a wire, an electrically conducting thread or a strand.

For fixation, the electrical conductors 14 can be woven into the webbing body 12 as warp threads or as weft threads.

In the embodiment, the electrical conductors 14 are woven into the webbing body 12 as warp threads.

The electrical conductors are electrically insulated from each other and from the environment. This can be done, for example, by means of an insulating varnish.

As is schematically illustrated in FIG. 1, short sections of the electrical conductors 14, and more precisely the end sections of the electrical conductors 14, are passed to a surface of the webbing body 12 to enable easier contacting of the electrical conductors 14. Other than shown in FIG. 1, the electrical conductors can also be laid in several arcs or in meander shape in the area of their end sections so as to allow strain relief.

It is also conceivable to bond the electrical conductors 14 or to sew them as sewing thread.

The electrical conductors 14 constitute a heat conductor, for example.

As an alternative, the electrical conductors 14 can form a sensor or can be connected to a sensor, such as a temperature sensor, or to an electronic unit not shown in the Figures for convenience.

According to the invention, the electrical conductors 14 are contacted using a flexible printed circuit 16 which is arranged on the webbing body 12.

In particular, two electrical conductors 14 at a time are connected to each other by the flexible printed circuit 16 to be electrically conducting, as shall be illustrated in detail below.

In this way, a heating circuit can be closed, for example.

However, the electrical conductors 14 are connected to each other at one end only. At their opposite end, the electrical conductors 14 are connected to a power source 17.

Figure 2:
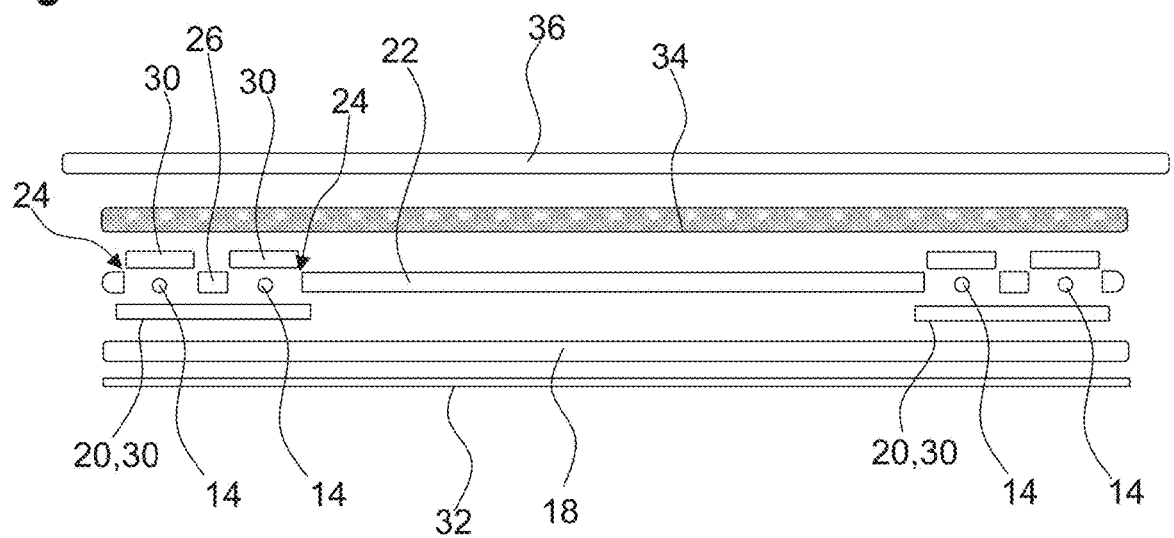
FIG. 2 schematically shows a layer composition comprising a flexible printed circuit arranged on a webbing body, FIG. 3 schematically shows a section across a schematically illustrated webbing according to the invention having the layer composition shown in FIG. 2.
Figure 3:
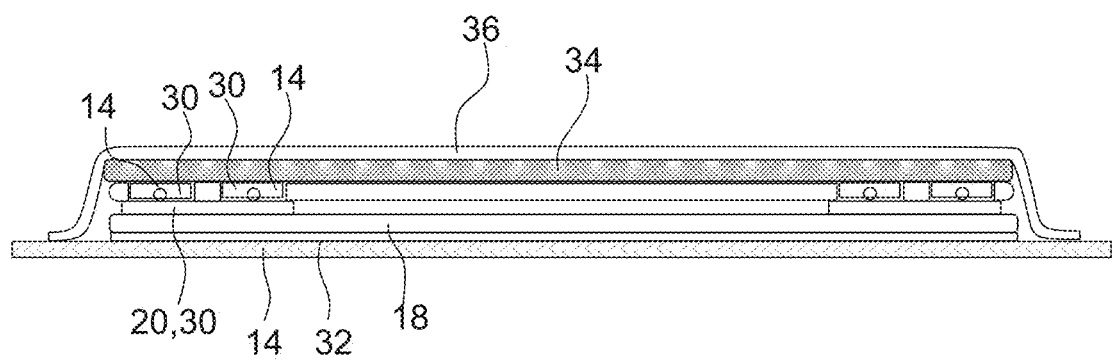

FIG. 2 illustrates a layer composition with the flexible printed circuit 16 shown in FIG. 1 schematically in an exploded view in a side view. FIG. 3 illustrates the layer composition on a webbing body 12.

The flexible printed circuit 16 comprises a plastic film 18, specifically a polyimide film forming a carrier of the flexible printed circuit 16.

According to one embodiment, two metal foils 20, specifically copper foils, are arranged on the plastic film 18. Further metal foils can be used, if more than nx2 electrical conductors are used. The metal foils 20 serve for establishing an electric contact with two electrical conductors 14 at a time. In particular, one metal foil 20 forms a bridge that connects two electrical conductors.

In an alternative embodiment, instead of the metal foil 20 an electrically conductive adhesive 30 can be provided, specifically an adhesive pad, an adhesive tape or an electrically conductive adhesive.

In addition, a further plastic film 22, which can also be made from polyimide, is arranged on the plastic film 18 formed as carrier and partially on the metal foil 20.

The additional plastic film 22 has recesses 24, however, so that the metal foil 20 is accessible. More precisely, the additional plastic film 22 covers an edge of the metal foil 20 and an edge of the plastic film 18.

Figure 4:
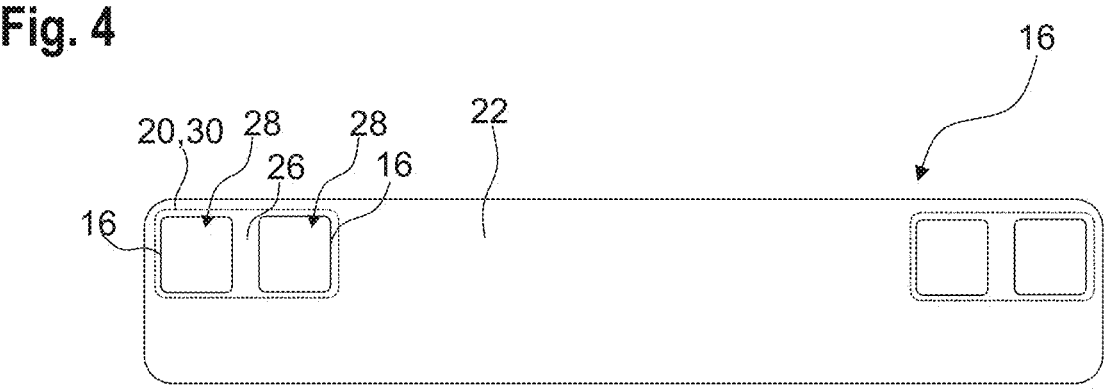
FIG. 4 shows a top view onto a schematically illustrated flexible printed circuit.

In addition, a land 26 dividing a metal foil 20 into two contact areas 28 (see FIG. 4) is formed in the plastic film 22 between two recesses 24. For better illustration, FIG. 4 shows the flexible printed circuit 16 in a top view.

For electrically connecting two electrical conductors 14, the electrical conductors 14 are arranged and electrically contacted on the flexible printed circuit 16 by means of an electrically conductive adhesive 30. More precisely, the electrical conductors 14 are adhesively bonded in the contact areas 28 of the metal foil 20 by means of the adhesive 30 and are thus electrically interconnected.

In the embodiment, the adhesive is an adhesive pad. However, it is also conceivable to use an electrically conductive liquid glue or an adhesive tape.

In another embodiment that is not shown for convenience, the land 26 can be omitted and an adhesive 30 can be used to fasten two electrical conductors 14 to the printed circuit 16.

A double-sided adhesive tape 32 is provided for fastening the flexible printed circuit 16 onto the webbing body 12.

Moreover, a padding 34 is arranged on the printed circuits 16, which may be provided as an option.

Preferably, the padding 34 is adhesively bonded.

The padding 34 is a compressible film intended to protect the printed circuits 16 and the electrical conductors 14 connected thereon against damage. In particular, the padding 34 cushions loads applied to the webbing 10 by pressure.

Moreover, optionally a thermoplastic film 36 is provided which also covers the printed circuit 16 and the electrical conductors 14 connected thereon. The thermoplastic film 36 protects the printed circuit 16 specifically against wear by abrasion. Further, the thermoplastic film 36 prevents the padding 34 from detaching from the webbing 10.

Instead of a thermoplastic film 36, also a PET film or a plastic cap can be provided.

Figure 5:
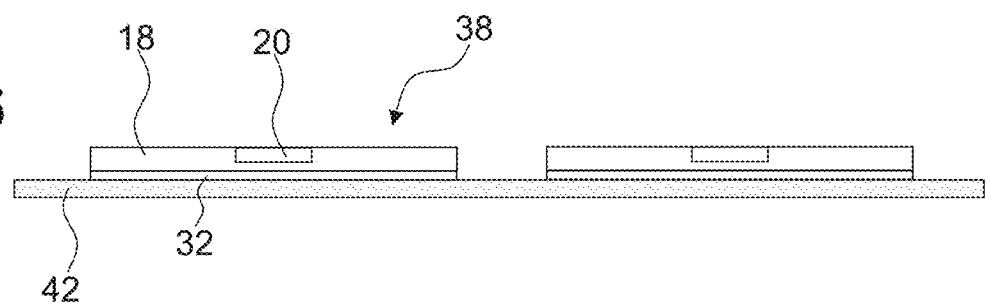
FIG. 5 shows a carrier film with a multi-layer adhesive element.
Figure 6:
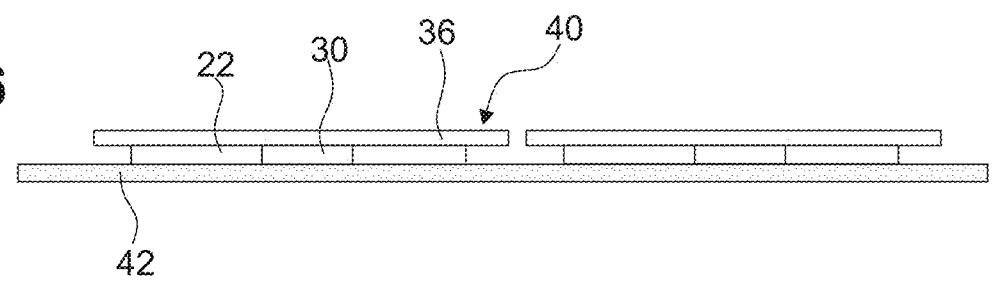
FIG. 6 shows a carrier film with a further multi-layer adhesive element.
Figure 7:
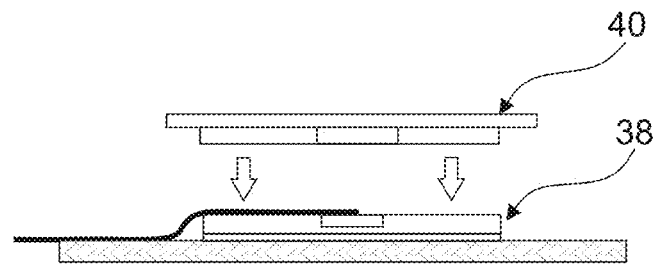
FIG. 7 shows the adhesive elements from FIGS. 5 and 6 and an electrical conductor to be fastened between the adhesive elements.

Based on the FIGS. 5 to 7, a method of manufacturing webbing 10 is illustrated.

On the one hand, a webbing body 12 and at least one electrical conductor 14 are provided.

Furthermore, there are provided two multi-layer adhesive elements 38, 40, each being arranged on a carrier film 42.

The layers of the first adhesive element 38 comprise a plastic film 18 and a metal foil 20 or an adhesive 30 as well as a double-sided adhesive tape 32.

The layers of the second adhesive element 40 comprise a plastic film 22 and an adhesive 30 as well as a thermoplastic film 36. Alternatively, the thermoplastic film 36 can be provided on a separate carrier.

A first and a second adhesive element 38, 40 are bonded together, the electrical conductor 14 being inserted between the adhesive elements 38, 40 and coming into contact with the metal foil 30 and, resp., the adhesive 30 (see FIG. 7). That is, the electrical conductor 14 is adhesively bonded between the adhesive elements.

The adhesive elements 38, 40 are adhesively bonded together with the electrical conductor 14 on the webbing body 12 to manufacture the webbing 10 shown in FIG. 3.

The invention claimed is:

1. Webbing (10) for a seatbelt system of an automotive vehicle, comprising a webbing body (12), at least one electrical conductor (14), and comprising a flexible printed circuit (16) which is arranged on the webbing body (12), wherein the at least one electrical conductor (14) is arranged and electrically contacted on the flexible printed circuit (16) using at least one electrically conductive adhesive (30), wherein the flexible printed circuit (16) includes a plastic film (18) and a metal foil (20) arranged on the plastic film (18), wherein the at least one electrical conductor (14) is arranged between the metal foil (20) and the electrically conductive adhesive (30).

2. Webbing (10) for a seatbelt system of an automotive vehicle, comprising a webbing body (12), at least one electrical conductor (14), and comprising a flexible printed circuit (16) which is arranged on the webbing body (12), wherein the at least one electrical conductor (14) is arranged and electrically contacted on the flexible printed circuit (16) using at least one electrically conductive adhesive (30), wherein the flexible printed circuit (16) includes a plastic film (18) and the at least one electrical conductor (14) is fastened and electrically contacted to the printed circuit (16) by means of two adhesives (30) arranged to be overlapping on the plastic film (18), wherein the electrical conductor (14) is arranged between the two adhesives (30).

3. Webbing (10) according to claim 1, wherein there is provided a further plastic film (22) which is arranged on the first plastic film (18) and which has a recess (24) in the area of the at least one adhesive (30).

4. Webbing (10) according to claim 1, wherein at least two electrical conductors (14) are provided, the two electrical conductors (14) being connected to each other by the flexible printed circuit (16) to be electrically conducting.

5. Webbing (10) according to claim 1, wherein the flexible printed circuit (16) is adhesively bonded on the webbing body (12).

6. Webbing (10) according to claim 1, wherein a padding (34) is arranged on the flexible printed circuit (16).

7. Webbing (10) according to claim 1, wherein the flexible printed circuit (16) is covered by a thermoplastic film (36), a PET film and/or a plastic cap.

8. Webbing (10) according to claim 1, wherein the electrical conductor (14) is a heat conductor or a sensor, or in that the electrical conductor (14) is electrically connected to a sensor or to an electronic unit.

9. A method of manufacturing a webbing (10) for a seatbelt system of an automotive vehicle, comprising a webbing body (12), at least one electrical conductor (14), and a flexible printed circuit (16) which is arranged on the webbing body (12), the at least one electrical conductor (14) being arranged and electrically contacted on the flexible printed circuit (16) using at least one electrically conductive adhesive (30), the method comprising the following steps:

- the webbing body (12) and the at least one electrical conductor (14) are provided,
- at least two multi-layer adhesive elements (38, 40) are provided each of which is arranged on a carrier film (42), the layers of a first adhesive element (38) comprising a plastic film (18) and a metal foil (20) or an adhesive (30), and the layers of a second adhesive element (40) comprising a plastic film (22) and an adhesive (30),
- a first and a second adhesive element (38, 40) are bonded together, wherein the at least one electrical conductor (14) is inserted between the adhesive elements (38, 40) and is in contact with the metal foil (20) and, resp., the adhesive (30), and
- the adhesive elements (38, 40) are adhesively bonded to the electrical conductor (14) on the webbing body (12).

10. Webbing according to claim 2, wherein at least two electrical conductors are provided, the two electrical conductors being connected to each other by the flexible printed circuit to be electrically conducting.

11. Webbing according to claim 2, wherein the flexible printed circuit is adhesively bonded on the webbing body.

12. Webbing according to claim 2, wherein a padding is arranged on the flexible printed circuit.

13. Webbing according to claim 2, wherein the flexible printed circuit is covered by a thermoplastic film, a PET film and/or a plastic cap.

14. Webbing according to claim 2, wherein the electrical conductor is a heat conductor or a sensor, or in that the electrical conductor is electrically connected to a sensor or to an electronic unit.

\* \* \* \* \*